United States Patent [19]
Gotoh

[11] Patent Number: 5,920,042
[45] Date of Patent: Jul. 6, 1999

[54] SEESAW SLIDING COMPOSITE MOTION SWITCH

[75] Inventor: Kazunori Gotoh, Miyagi-ken, Japan

[73] Assignee: Alps Electric Co., Ltd., Tokyo, Japan

[21] Appl. No.: 08/880,128

[22] Filed: Jun. 20, 1997

[30] Foreign Application Priority Data

Jun. 28, 1996 [JP] Japan .................................. 8-169610
Oct. 31, 1996 [JP] Japan .................................. 8-290379

[51] Int. Cl.$^6$ .................................................... H01H 9/00
[52] U.S. Cl. ...................... 200/5 R; 200/16 C; 200/339; 200/551; 200/561
[58] Field of Search .................... 200/16 C, 18, 200/5 R, 61.54, 61.27, 50.33, 50.35, 339, 561, 551

[56] References Cited

U.S. PATENT DOCUMENTS

| | | | |
|---|---|---|---|
| 4,600,237 | 7/1986 | Huber et al. ............................ | 296/223 |
| 5,623,134 | 4/1997 | Hayakawa .............................. | 200/5 R |

FOREIGN PATENT DOCUMENTS

393172 C1  12/1990  Germany.

*Primary Examiner*—Renee S. Luebke
*Attorney, Agent, or Firm*—Brinks Hofer Gilson & Lione

[57] ABSTRACT

A seesaw sliding composite motion switch is provided. The switch includes at least two switch elements disposed on a printed wiring board, a holder placed on the printed wiring board, and a slider which moves in a sliding manner between the printed wiring board and the holder. The slider has lever swingingly supporting portions projecting from openings defined on the holder. A lever is supported by the lever swingingly supporting portions. First projections are disposed on the holder. Openings permitting swinging motion are defined on the lever and accommodate the first projections only at a neutral position of a sliding motion to thereby permit the lever to turn. Second projections are disposed on the holder and abut against the lever when it turns to thereby prevent the sliding motion of the slider. Balls are disposed on the slider. A swing return first cam portion is disposed on the lever and has one of the balls abutted thereagainst. A slide return second cam portion is disposed on the holder and has another of the balls abutted thereagainst. With this arrangement, the seesaw sliding composite motion switch can move in four directions, that is, sliding directions and swing directions from the neutral position, is less likely to break even if a strong force is applied thereto, permits a metal mold to be made into a simple structure, can be easily assembled, and has high switching reliability.

2 Claims, 14 Drawing Sheets

SEESAW SLIDING COMPOSITE MOTION SWITCH

BACKGROUND OF THE INVENTION

1. Field of the Invention

The present invention relates to a seesaw sliding composite motion switch capable of executing both the operations of seesaw or push-pull operation and a slide operation, and more specifically, to a seesaw sliding composite motion switch for actuating a sunroof actuating/driving device of a motor vehicle by an oppositely directed push-pull operation or slide operation of a vehicle sunroof and the like.

2. Description of the Related Art

Conventionally, this type of a device is disclosed in the specification of U.S. Pat. No. 4,600,237 or Germany Unexamined Patent Publication No. 3931722.

As shown in FIG. 12 and FIG. 13, such a conventional seesaw sliding composite motion switch 90 is assembled to a vehicle roof 91. The opening/closing actuating/driving device of a vehicle sunroof 92 is actuated by the oppositely directed slide operation of a single knob 100. Further, the lifting/lowering actuating/driving device of the vehicle sunroof 92 is actuated by the oppositely directed swing operation of the knob 100.

As shown in FIG. 13, when operation is executed in four directions (turning ON of contacts) by the single knob 100, pins 102, 102 are disposed to the knob 100 and a simultaneous turning ON preventing cross groove 104 is defined to a holder 103 so that simultaneous turning ON is prevented in such a manner that the pins 102 of the knob 100 trace in the cross groove 104.

The term, "simultaneous turning ON" used here means that the knob 100 executes a swinging motion simultaneous with a sliding motion or vice versa .

FIG. 14 shows a longitudinal sectional view of the conventional seesaw sliding composite motion switch and FIG. 15 is a sectional view taken along the line XIV—XIV of FIG. 14.

As shown in these drawings, a slider 73 is automatically returned by the cooperation of a contact bridge 72 disposed on the floor portion 71 of a holder 103, an urged ball 74 disposed to the slider 73, and a guide bush 75 and a guide ball 76 as well as a switch leg portion 78 slidingly mounted to the slider 73 through a shaft portion 77 is returned to the middle point of swing by a contact bridge 79 moving together with the slider 73 and an urged ball 80 disposed to the switch leg portion 78. The conventional device has the following problems:

(1) since the restricted size of a switch restricts the size of the pins 102 of the knob 100, if a large actuating force is applied to the pins 102 and a large shear force is generated thereto by a driver who actuates an actuating element, there is a possibility that the pins 102 will be broken;

(2) since a slide core must be formed to a metal mold by the provision of the cross groove 104, the shape of the metal mold is made complex, and the cost of the metal mold is increased; and;

(3) since insufficient contact to a contact portion may be caused by an invasion of dirt such as dusts and the like from the cross groove 104, there is a possibility that the switch will not be securely operated.

In the above conventional device, since one of the ball and the contact bridge 79 or the guide bush 75, each relating the return of the slider 73, is disposed to the slider 73 and the other is disposed on the floor portion 71 of the holder 103 and they are elastically engaged with each other, it is difficult to assemble them. Since the contact is used as a portion of a return mechanism, an external force is directly applied to the contact to thereby lower the reliability of switching. Further, the arrangement of the switch is restricted and cannot be selected from a wide variety of arrangements.

A first object of the present invention is to provide a seesaw sliding composite motion switch which can execute a motion in four directions, or both the sliding directions and both the swing directions, from a neutral position; has no possibility of deformation or breakage which arises in the conventional device even if a strong force is applied to the switch, because the force is dispersed by the switch; and can use a metal mold of simple structure and reduced cost.

A second object of the present invention is to provide a seesaw sliding composite motion switch which can independently and stably execute a motion in four directions, or both the sliding directions and both the swing directions (vent motion direction), from a neutral position by a simple arrangement.

A third object of the present invention is to provide a seesaw sliding composite motion having a feature that, since a slide and swinging motion return mechanism is completed when a holder is assembled with a slider and a lever, an assembly job effected thereafter can be performed easily; and since no switching element is related to the returning mechanisms, the reliability of switching is not lowered and various types of switch mechanisms can be employed.

SUMMARY OF THE INVENTION

The first object can be solved by first means comprising a case member; first projections disposed to the case member; a slider slidingly accommodated in the case member; a lever swingingly supported by the slider and having swinging motion permitting openings into which the first projections are inserted only when the slider is turned at a predetermined position to thereby permit the lever to swing; second projections disposed to the case member and abutted against the lever when the lever is swung to thereby prevent the sliding motion of the slider; a first switch element moved by the sliding motion of the slider; and a second switch element moved by the swinging motion of the lever.

The second object can be solved by second means which is arranged in the first means such that an approximately V-shaped first cam portion is disposed to the lever as well as an approximately V-shaped second cam portion is disposed to the case member, first and second actuating members, which come into elastic contact with the first cam portion or the second cam portion, are disposed to the slider, the lever in a non-actuating state is returned to a neutral position by the pressurized contact force of the first actuating member which is in elastic contact with the first cam and the slider in a non-actuating state is returned to the neutral position by the pressurized contact force of the second actuating member which is in elastic contact with the second cam.

The third object can be solved by third means comprising a printed wiring board; at least two switch elements disposed on the printed wiring board; a holder located on the printed wiring board; a slider slidingly moving between the printed wiring board and the holder; openings defined to the holder; lever swingingly supporting portions disposed to the slider and projecting from the openings; a lever supported by the lever swingingly supporting portions; a ball disposed to any one of the lever and the slider and urged; a first return cam portion disposed to the other of the lever and the slider and having the ball urged thereagainst; a ball disposed to any one of the slider and the holder and urged; and a second return cam portion disposed to the other of the slider and the holder and having the ball urged thereagainst, wherein at least one of the switch elements is opened and closed by the swinging motion of the lever and at least the other of the switch elements is opened and closed by the sliding motion of the switch elements.

DESCRIPTION OF THE PREFERRED EMBODIMENT

Figure 1:
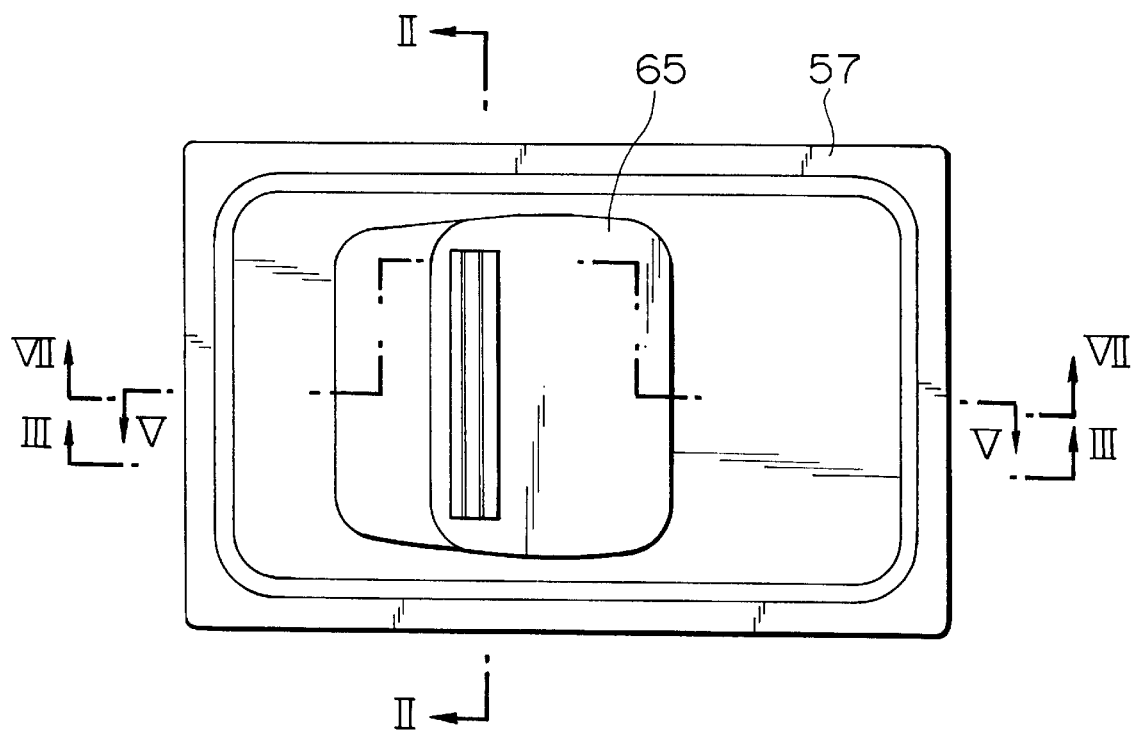
FIG. 1 is a plan view of a seesaw sliding composite motion switch according to an embodiment of the present invention.
Figure 2:
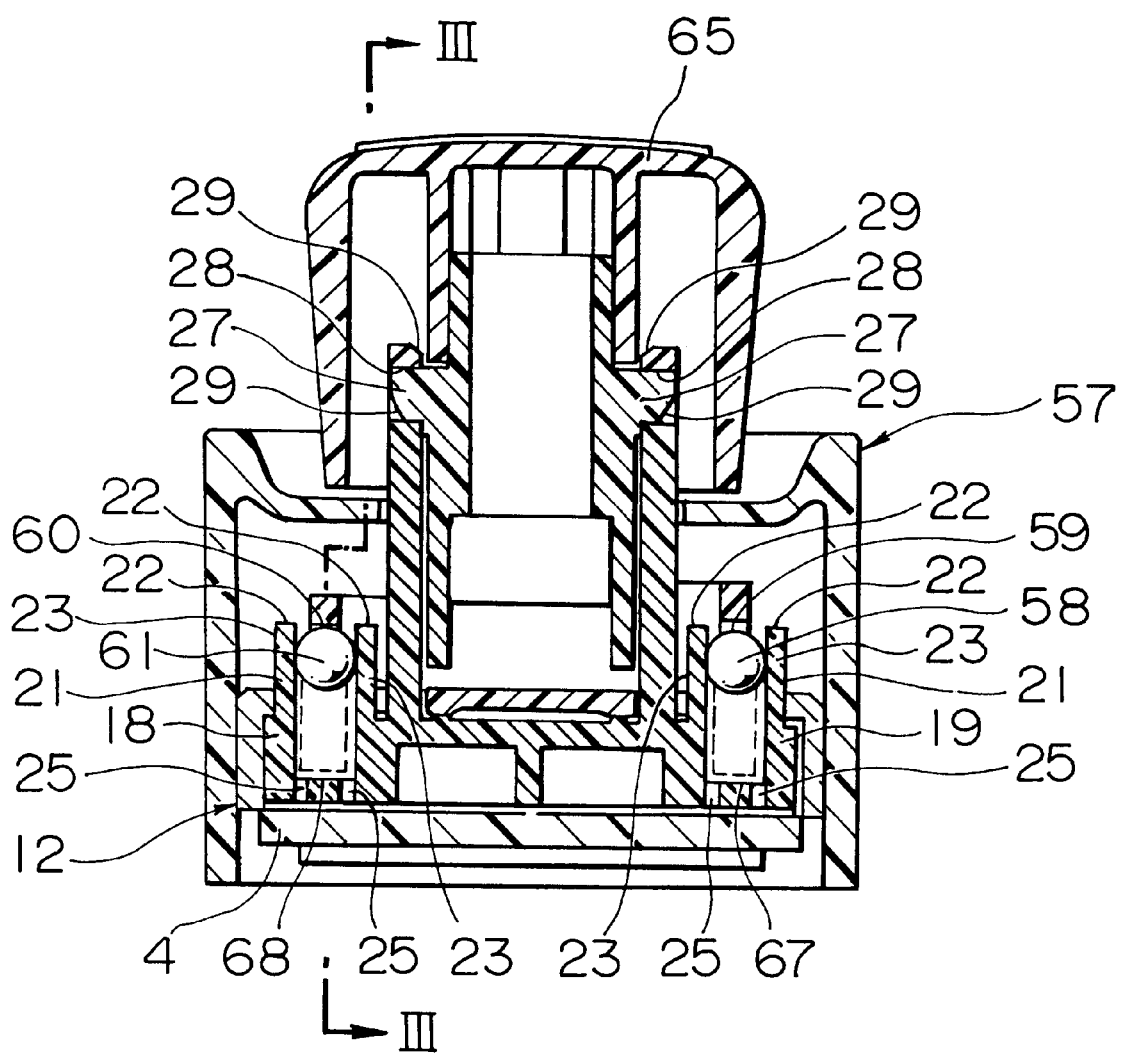
FIG. 2 is a sectional view taken along the line II—II of FIG. 1.

An embodiment of the present invention will be described with reference to FIG. 1 to FIG. 11.

In these drawings, numeral 1 denotes a cover having an upper surface on which a wafer 3 provided with terminals 2, 2 . . . is placed and a printed wiring board 4 is further placed thereon. Inserting holes 6, 6 into which fixing screws 5, 5 are inserted are defined to the cover 1. Further, snap locking projections 9, 9 and positioning projections 10, 10 are disposed to the sides of the cover 1.

The upper ends of the terminals 2, 2 . . . of the wafer 3 are inserted into through holes 4b defined to the printed wiring board 4 and connected to a conductor pattern formed to the printed wiring board 4 by soldering.

The fixed contacts 7a, 7b of a switch corresponding to a seesaw motion and a fixed contact 8 of a switch corresponding to a sliding motion are formed on the printed wiring board 4. A pattern wired to the terminals 2, 2 . . . is also formed thereon, although it is not shown.

A slider 11 is placed on the printed wiring board 4. Further a rectangular-box-shaped holder 12 having a lower surface opened (which constitutes a portion of a case member) is placed over the printed wiring board 4 so as to cover the slider 11. An engaging claw 41, to be described later, of the holder 12 is snap locked to the locking projections 9 of the cover 1. Then, a space formed between the printed wiring board 4 and the holder 12 permits the slider 11 to slide on the printed wiring board 4.

The slider 11 is composed of a slider main body 14 located between the printed wiring board 4 and the holder 12, an accommodating recess (not shown) formed on the lower surface of the slider main body 14 for accommodating and holding a first movable contact 15, a pair of lever swingingly supporting portions 17, 17 standing on the upper surface of the slider main body 14 and spaced apart from each other in a direction perpendicular to a sliding direction, and ball and coil spring accommodating portions 18, 19 disposed on both the outsides of the lever swingingly supporting portions 17 on the upper surface of the slider main body 14.

When viewed from an upper side, the slider main body 14 is formed to an approximately T-shape and has a thickness gradually thinned in upper and lower directions, with a rib formed to the entire portion thereof to keep strength. Further, the slider main body 14 has projected portions 20, 20 formed at several positions of the corners on the upper and lower surfaces thereof to reduce friction caused when it slides.

The ball and coil spring accommodating portions 18, 19 pass through the slider main body 14 in the upper to lower direction thereof. A plurality (two pieces in the embodiment, which are disposed on a line perpendicular to the sliding direction) of ball escape preventing elastically locking portions 23, 23, each having a cylindrical portion 21 and a claw portion 22 formed upward and inward from the upper end of the cylindrical portion 21, project from the upper opening of each of the ball and coil spring accommodating portions 18, 19. Support portions 25, 25 for supporting the lower ends of the coil springs 67, 68 are disposed on the lower inner peripheral surfaces of the ball and coil spring accommodating portions 18, 19, respectively. Balls 58, 61 are disposed on the upper ends of the coil springs 67, 68 and engaged with the claw portions 22 of the elastically locking portions 23, 23 such that they compress the coil springs 67, 68 so as to be prevented from escaping and held in the ball and coil spring accommodating portions 18, 19.

Note, the locking force for locking the balls 58, 61, which is applied thereto by the claw portions 22 and the elastic force of the elastically locking portions 23, 23, is set to such a degree that when the balls 58, 61 are mounted, the elastically locking portions 23, 23 are elastically deformed outward and the mounted balls 58, 61 are not flown out by the spring force of the coil springs 67, 68.

The pair of lever swingingly supporting portions 17, 17 are formed on a sheet shape. Bearing holes 28, 28, into which swing shafts 27, 27 of a lever 26 are inserted to swingingly support the lever 26, are defined on the upper portions of the supporting portions 17, 17. Further, side sheet portions are formed on both the side ends of each of the lever swingingly supporting portions 17, 17 up to positions a little lower than the bearing hole 28 to reinforce the supporting portions 17, 17. Note, the swing shafts 27, 27 of the lever 26 can be easily inserted into the bearing holes 28, 28 of the pair of lever swingingly supporting portions 17, 17 because the lever swingingly supporting portions 17, 17 are widened by the swing shafts 27, 27 of the lever 26 as well as tapers 29, 29 are formed to the supporting portions 17, 17 respectively.

The holder 12 for constituting a portion of the case member is formed to a rectangular-box-shape with the lower surface opened, that is, the holder 12 is formed on the box shape by an upper sheet 30 and respective side sheet portions 31, 31 . . . formed downward from the respective sides of the upper sheet portion 30. The upper sheet portion 30 of the holder 12 has an approximately rectangular first opening 33, which permits one of the pair of lever swingingly supporting portions 17, 17 of the slider 11 to project upward, and is defined to a position corresponding to the upper portion of the ball and coil spring accommodating portion 18. The upper sheet portion 30 further has an approximately rectangular second opening 34, which permits the other of the pair of lever swingingly supporting portions 17, 17 to project upward, and is defined to a position corresponding to the upper portion of the ball and coil spring accommodating portion 19. The upper sheet portion 30 further comprises an approximately V-shaped second cam portion 60 disposed on the lower end surface of a bridging portion 32 bridged in the longitudinal direction of the first opening 33. First projections 35, 35 project from the center of the upper sheet portion 30 between the first opening 33 and the second opening 34, respectively. The upper sheet portion 20 further has actuator inserting holes 37, 37 which are defined outwardly of the first projections 35, 35 and into which actuators 36, to be described later, are inserted by being guided thereby. A pair of second projections 38, 38 project outwardly of each of the actuator inserting holes 37, 37. The upper sheet 30 further has inserting holes 39, 39 into which fixing screws 5 are inserted. Further, positioning projections 40 and snap locking claws 41 are disposed to the side sheet portions 31 of the holder 12.

Figure 10:
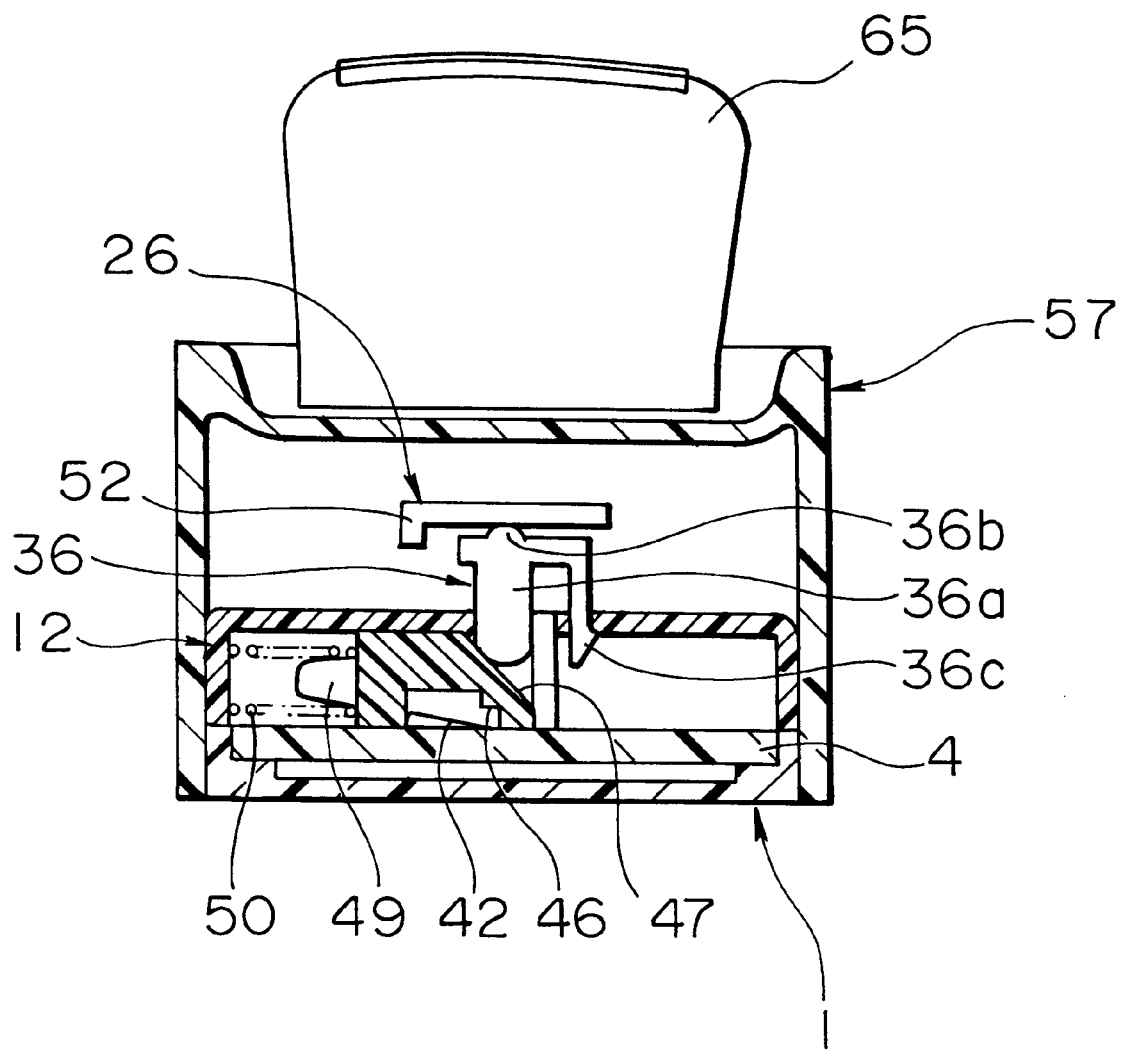
FIG. 10 is a sectional view taken along the line X—X of FIG. 5.
Figure 11:
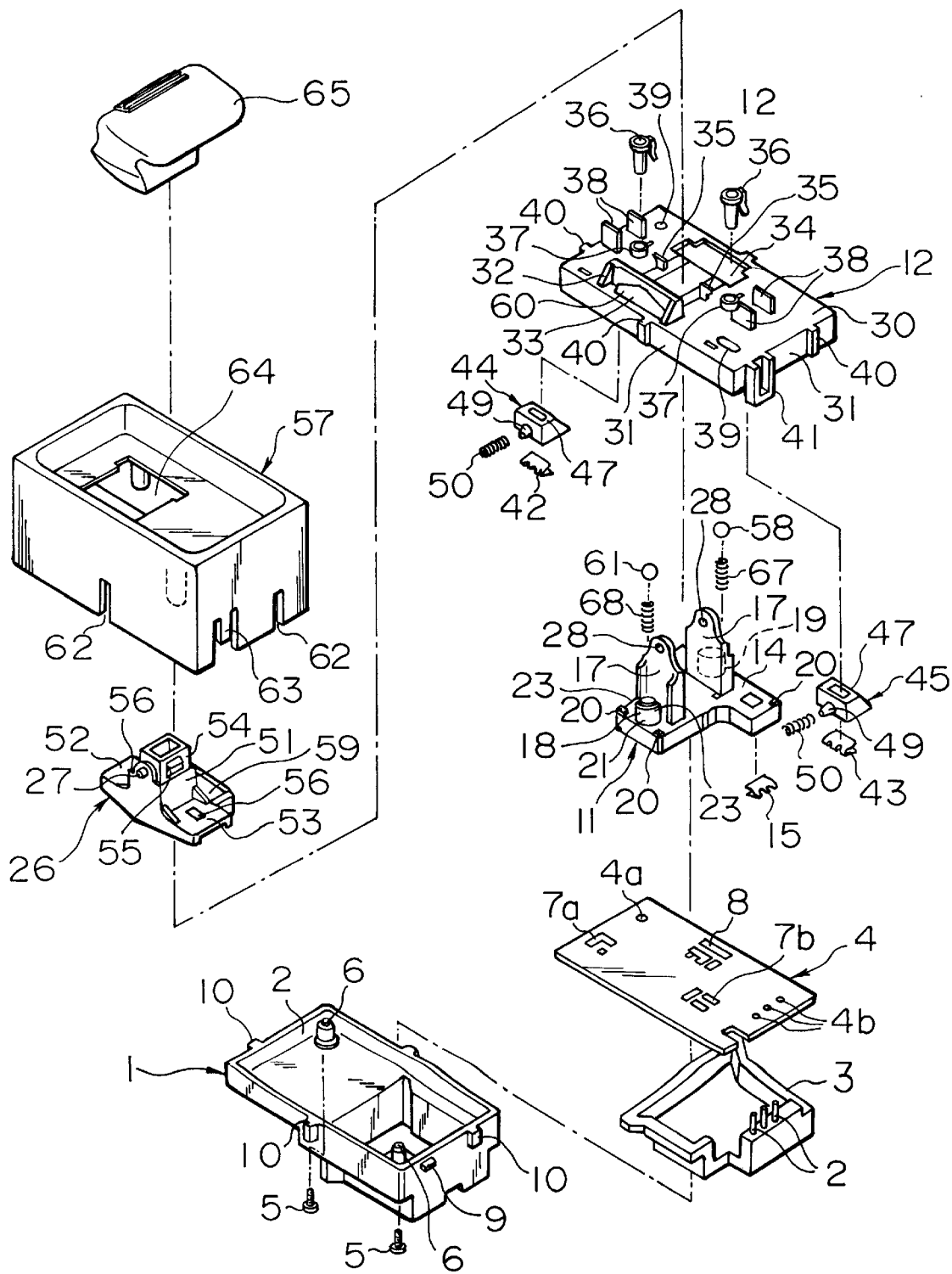
FIG. 11 is an exploded perspective view of a seesaw sliding composite motion switch according to the embodiment of the Present invention.
Figure 12:
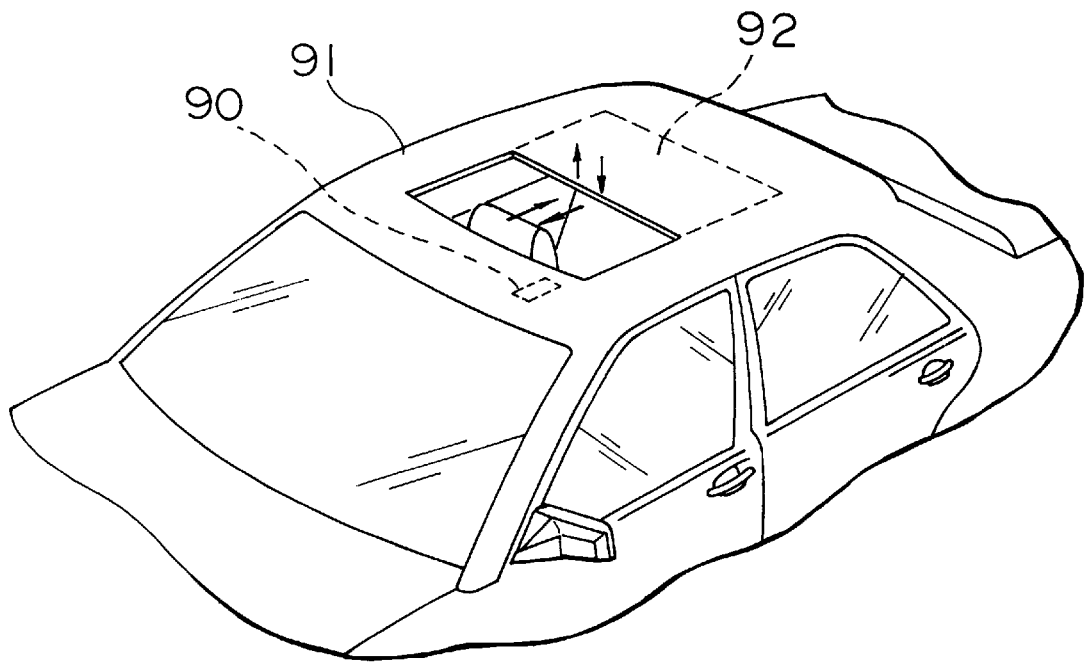
FIG. 12 is a schematic perspective view of a vehicle roof having a slidingly lifting/lowering roof.
Figure 13:
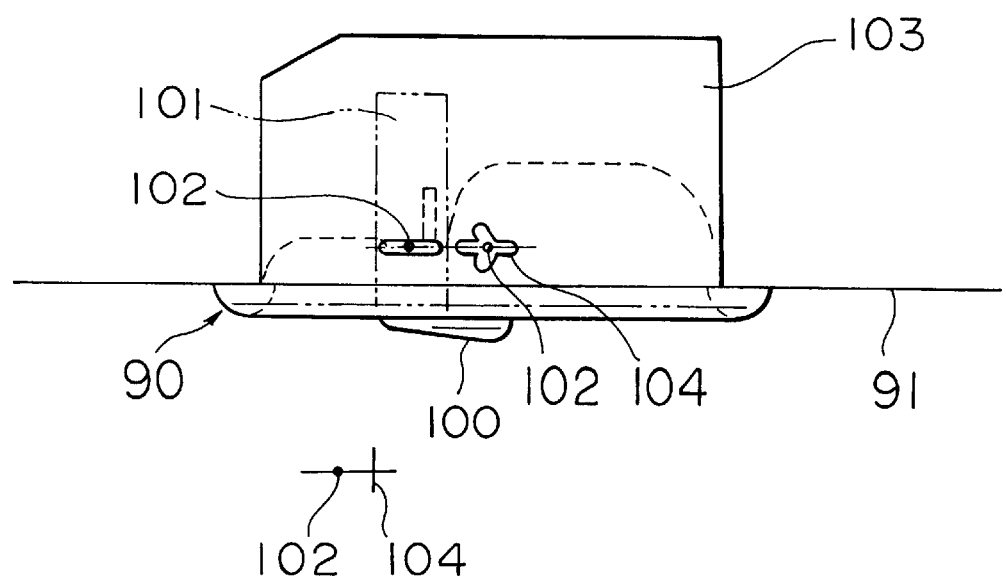
FIG. 13 is an explanatory view schematically showing a conventional seesaw sliding composite motion switch.
Figure 14:
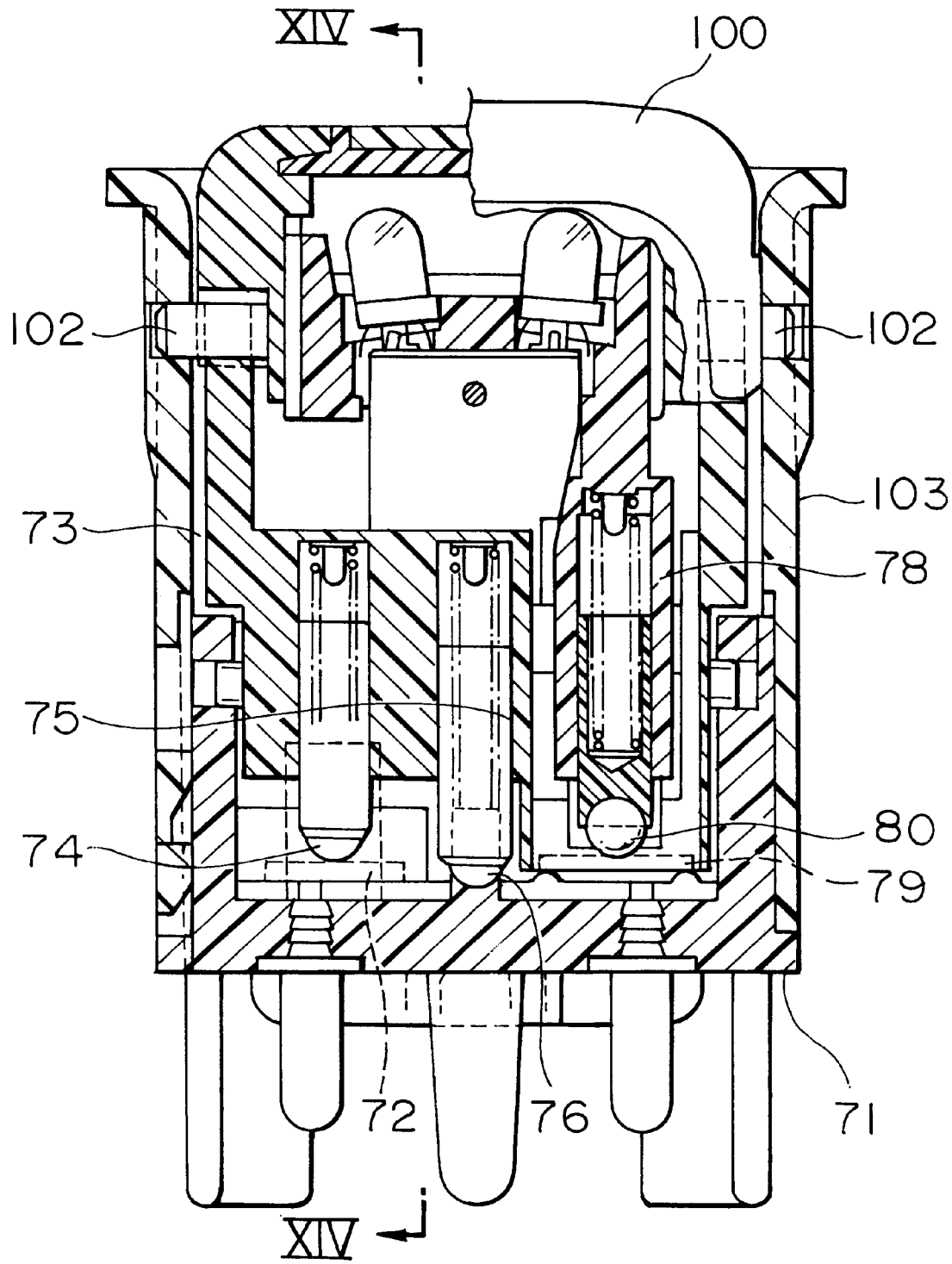
FIG. 14 is a longitudinal sectional view of the main portion of a conventional seesaw sliding composite motion switch.
Figure 15:
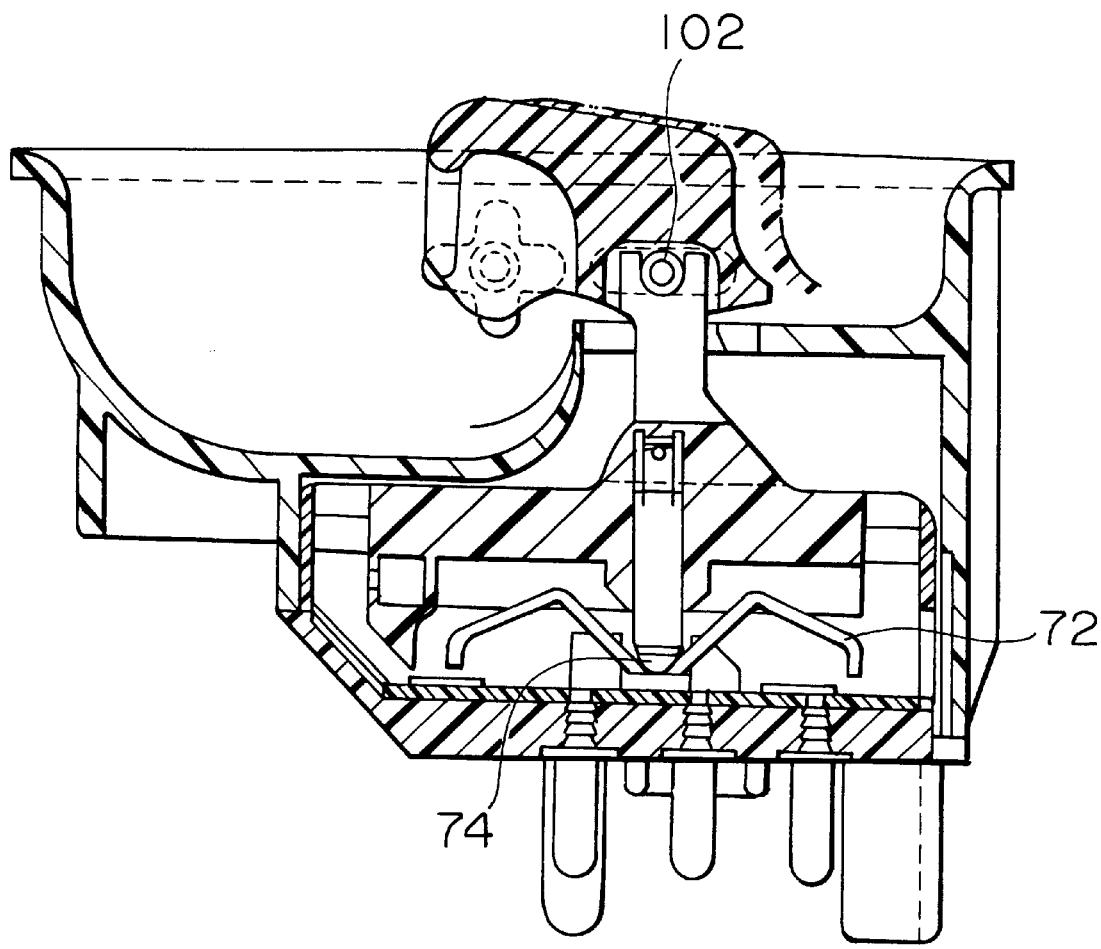
FIG. 15 is a sectional view taken along the line XIV—XIV of FIG. 14.

As shown in FIG. 10 and FIG. 11, each of the actuators (switch elements) 36 includes a guide shaft 36a inserted into the actuator inserting hole 37 of the holder 12 and guided in an upper to lower direction, a spherical abutting portion 36b projecting from the upper surface of the guide shaft 36a and abutted against the lower surface of the swing sheet portion 52 or 53 of the lever 26, and an escape preventing claw portion 36c formed to an lower end of an arm piece extending from the upper portion of the guide shaft 36a in a side direction and further extending downward. The guide shaft 36a is abutted against the inclined surface 47 of a movable contact slider 44 or 45. Note, the claw portion 36c of the actuator 36 is also inserted into the hole of the holder 12.

As described above, the second cam portion 60 of the holder 12 is composed of a cam surface whose central portion is deepened and cut to a V-shape on the lower end surface of the bridging portion 32. The position of the central portion of the second cam portion 60 where the ball 61 is located is the neutral position of a sliding motion.

The movable contact sliders 44, 45, which accommodate and hold second movable contacts 42, 43, respectively, are slidingly guided on the printed wiring board 4 in the holder 12 in a direction perpendicular to the sliding direction of the slider 11 in addition to the slider main body 14 of the slider 11.

Accommodating recesses 46 for accommodating and holding the second movable contacts 42, 43 are formed to the bottom surfaces of the movable contact slider 44 or 45, respectively. Further, one side of each of the movable contact sliders 44, 45 is arranged as the inclined surface 47 against which the lower end of the actuator 36 is abutted, and the movable contact slider 44 or 45 is slidingly moved by the upward/downward motion of the actuator 36 caused by the swinging motion of the lever 26, to be described later.

Numeral 49 denotes a projection for holding a coil spring 50 which projects from the side of each of the movable contact sliders 44 and 45 opposite to the inclined surface 47. Thus, the spring force of the coil spring 50 acts in a direction for moving the actuator 36 upward through the inclined surface 47.

The sliding motion of the movable contact sliders 44 and 45 causes the second movable contacts 42, 43 on the bottoms thereof to slide on the fixed contacts 7a, 7b of the printed wiring board 4.

The lever 26 is formed to an inverted T-shape as a whole by a rectangular-column-shaped main body 51 and approximately sheet-shaped swing sheet portions 52, 53 disposed to the lower portion of the main body 51 on both the sides thereof. The lever 26 includes the swing shafts 27, 27, which project from both the upper sides of the main body 51 and are inserted into the bearing holes 28, 28 of the pair of lever swingingly supporting portions 17, 17; a knob fitting portion 54 formed a little slender to the main body 51; and engaging projections 55, 55 projecting from both the sides of the knob fitting portion 54.

Swinging motion permitting openings 56, 56, into which the first projections 35, 35 of the holder 12 are inserted when the lever 26 is swung at a neutral position, are defined to the swing sheet portions 52, 53 of the lever 26. When the lever 26 is slid from the neutral position, since the first projections 35, 35 are dislocated from the swinging motion permitting openings 56, 56 and abutted against the swing sheet portions 52, 53 of the lever 26, the swinging motion of the lever 26 at a position other than the neutral position is regulated.

Figure 9:
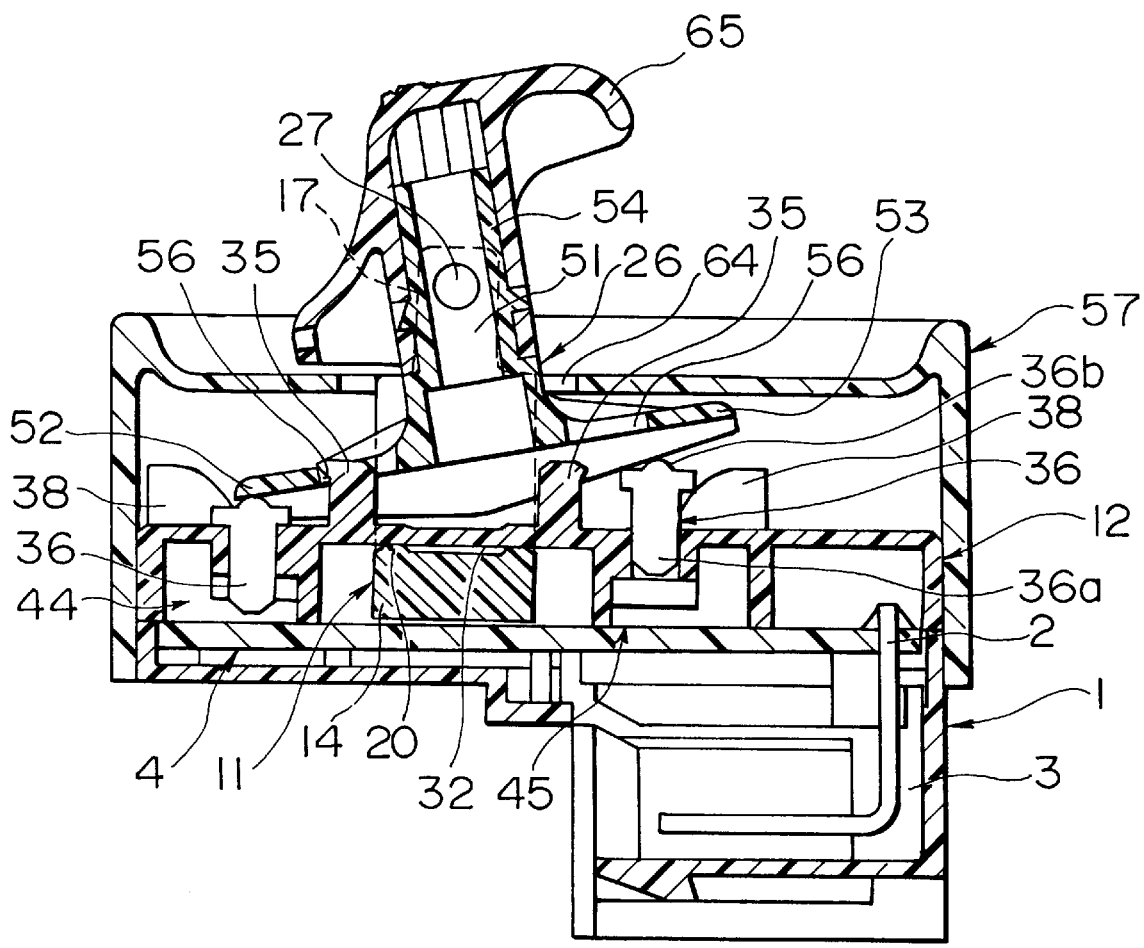
FIG. 9 is a sectional view showing a state that the slider is swung from the neutral position in FIG. 7.

On the other hand, although the lever 26 which is swung at the neutral position is swung in such a manner that the first projections 35, 35 are inserted into the swinging motion permitting openings 56, 56 as described above, when the lever 26 is inclined by the swinging motion, the end of the swing sheet portion 52 or 53 of the lever 26 is abutted against the side end of the second projection 38 of the holder 12 to thereby prevent the sliding motion of the lever 26 and the slider 11 as shown in FIG. 9.

A first cam portion 59, which is swung by the ball accommodated in the ball and coil spring accommodating portion 19 of the slider 11 and pressed thereagainst, is disposed to a side of the swing sheet portions 52, 53 of the lever 26. The first cam portion 59 is composed of a cam surface whose central portion is deepened and cut to a V-shape on the lower end of a square frame formed integrally with the side of the swing sheet portions 52, 53 of the lever 26. The central portion of the first cam portion 59 where the ball 58 is located is the neutral position.

Note, since a force for causing the balls 58 and 61 to be slid to the neutral position, respectively by the spring force of the coil springs 67, 68, acts on the lever 26 and the slider 11 in the first cam portion 59 and a second cam portion 60, when an actuation force is removed, the lever 26 and the slider 11 automatically return to the neutral position.

Numeral 57 denotes a case which constitutes a portion of the case member. The case 57 is formed to a square-box-shape with a lower surface opened. Cutout grooves 62, 62 . . . , into which the projections 10, 10 . . . , for positioning the cover 1 and the projection 40 for positioning the holder 12 are inserted, are formed to the sides of the case 57. An embossed portion with which the screws 5 are threaded is formed in the case 57.

Further, an opening 64, into which the pair of lever swingingly supporting portions 17, 17 and the upper portion of the main body 51 of the lever 26 are inserted and project upward, is defined to the upper surface of the case 57.

A knob 65 is fitted to the knob fitting portion 54 of the main body 51 of the thus projectingly formed lever 26. Engaging holes 66, 66, with which the engaging projections 55, 55 of the knob fitting portion 54 are engaged, are defined to the knob 65. Note, a taper surface is formed to each of the engaging projections 55, 55 of the knob fitting portion 54 and the opening edge of the fitting hole in the knob 65. Further, the engaging projections 55, 55 are engaged with the engaging holes 66, 66 by pushing the engaging projections 55, 55 of the knob fitting portion 54 into the fitting hole in the knob 65 by the elastic deformation of the knob 65.

Next, operation of the embodiment will be described.

Figure 3:
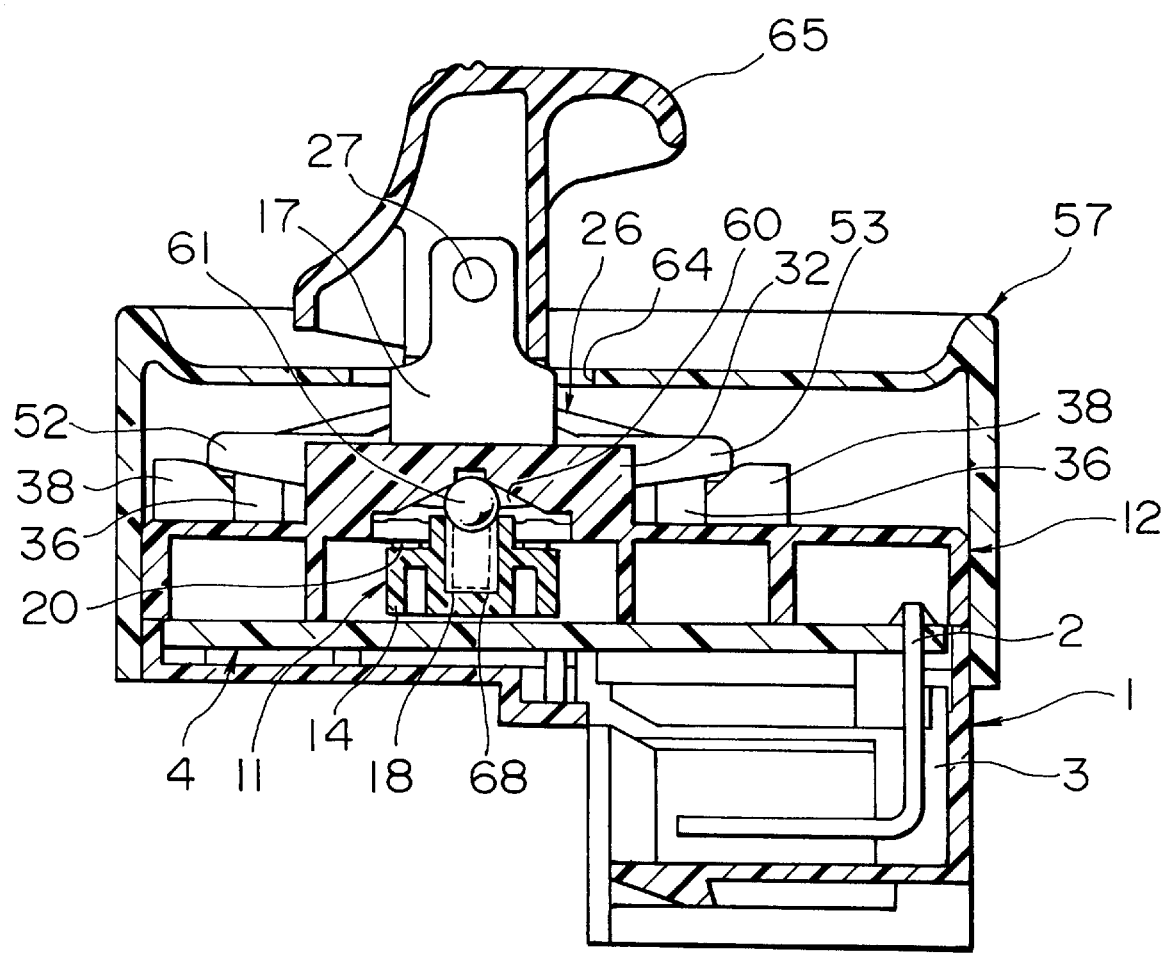
FIG. 3 is a sectional view taken along the lines III—III shown in FIG. 1 and FIG. 2.
Figure 5:
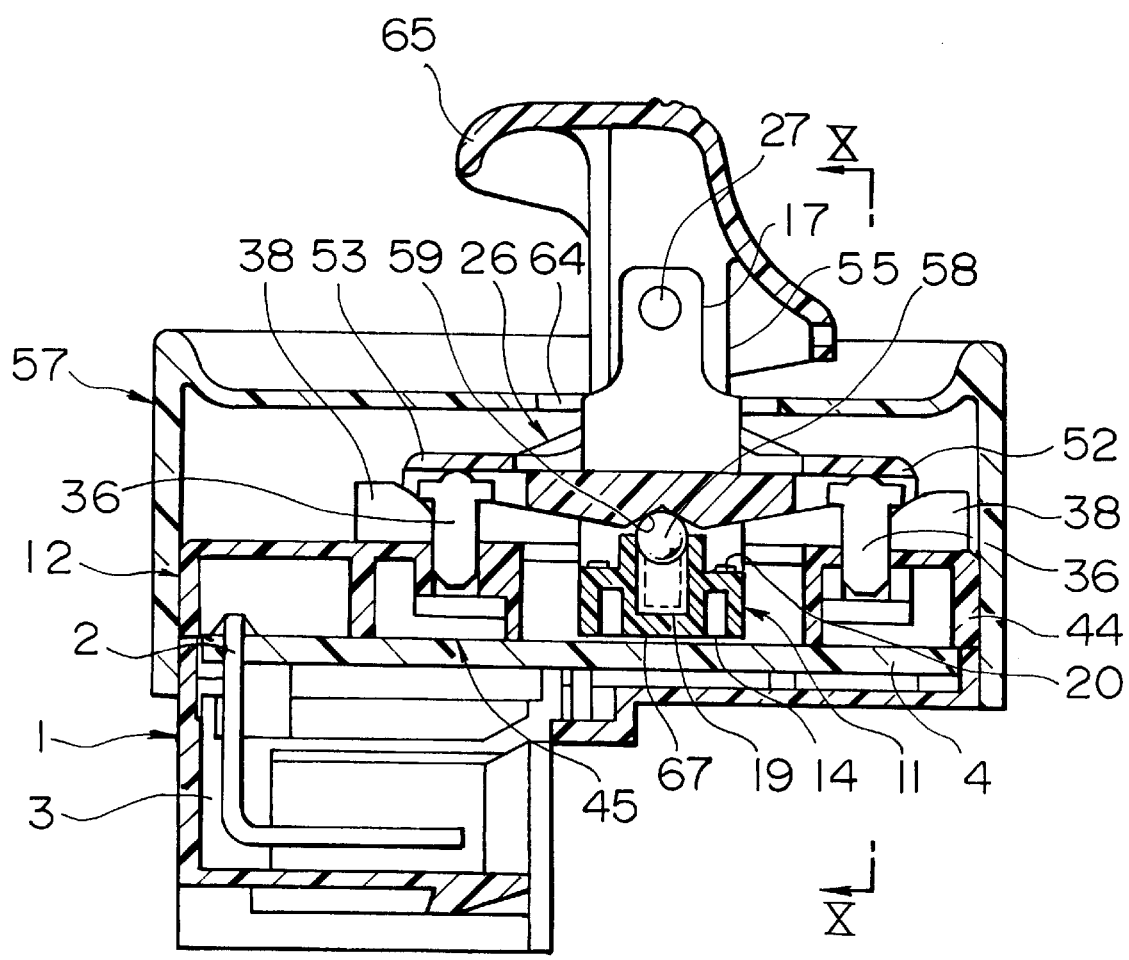
FIG. 5 is a sectional view taken along the line V—V of FIG. 1.
Figure 7:
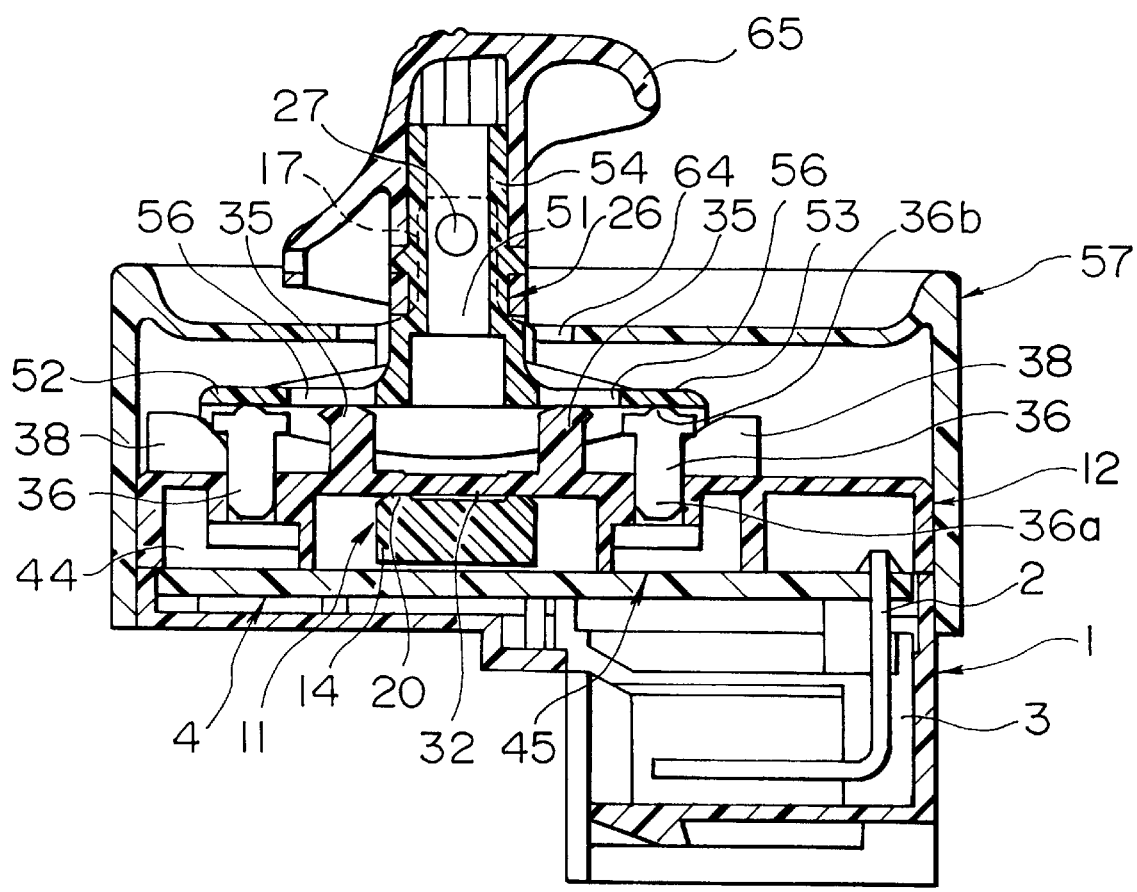
FIG. 7 is a sectional view taken along the line VII—VII of FIG. 1.

First, a non-actuating state will be described. FIG. 3, FIG. 5, and FIG. 7 show the state of respective mechanisms in the non-actuating state.

FIG. 3 mainly shows a mechanism relating to a sliding motion. When no sliding actuation force is applied to the knob 65, since the ball 61 is pressed against the second cam portion 60 by the spring force of the coil spring 68, the ball 61 tends to move to the most deeply cut portion of the second cam portion 60 and to be held therein. Therefore, the knob 65 and the slider 11 are returned to the neutral position of the sliding motion of the second cam portion 60 as shown in FIG. 3.

FIG. 5 mainly shows a mechanism relating to the swinging motion of the knob 65. When no actuation force is applied to the knob 65 in a swinging direction, since the ball 58 is pressed against the first cam portion 59 by the spring force of the coil spring 67, the ball 58 tends to move to the most deeply cut portion of the first cam portion 59 and to be held therein. Thus, since the spring force of the coil spring 67 acts on the knob 65 in a non-inclining direction, the knob 65 is returned to the neutral position of the swinging motion of the first cam portion 59 as shown in FIG. 5.

As shown in FIG. 7, the swinging motion permitting openings 56, 56 of the swing sheet portions 52, 53 of the lever 26 confront the first projections 35, 35 of the holder 12 in the non-actuating state. Strictly speaking, when the lever 26 is swung about the swing shafts 27, 27 at the neutral position, the first projections 35, 35 are disposed in the loci of the swinging motion permitting openings 56, 56 defined on both the sides of the swing shafts 27, 27. As a result, even if the lever 26 is swung at the neutral position, it is not regulated by the first projections 35, 35.

Next, a swinging motion executed from the non-actuating state shown in FIG. 5 (and FIG. 3, FIG. 7) will be described with reference to FIG. 6.

When an actuation force is applied to the knob 65 in a swinging direction (clockwise) from the state shown in FIG. 5, the knob 65 is swung clockwise about the swing shafts 27, 27 together with the lever 26 arranged integrally therewith. Since the swinging motion causes the first cam portion 59 of the lever 26 also to move clockwise about the swing shafts 27, 27, the ball 58 located at the neutral position at the center of the first cam portion 59 slides to the inclined surface of the first cam portion 59 and is gradually pushed downward by the inclined surface of the first cam portion 59 so that the coil spring 67 is compressed, whereby the state shown in FIG. 6 is achieved.

In the swinging motion at the neutral position as described above, the first projections 35, 35 of the holder 12 are located in the swing loci of the swinging motion permitting openings 56, 56 of the swing sheet portions 52, 53 of the lever 26 as shown in FIG. 7. Therefore, when the lever 26 is swung clockwise about the swing shafts 27, 27 from the state in FIG. 5 (FIG. 7) as described above, the swing sheet portion 52 on the left side of the lever 26 moves downward and the swing sheet portions 53 on the right side moves upward. At the time, since the first projection enters the swinging motion permitting opening 56 of the swing sheet portion 52 as shown in FIG. 9 (the same state as that in FIG. 6), the swinging motion of the knob 65 and the lever 26 is not regulated by the first projections 35, 35 at the neutral position. That is, the knob 65 and the lever 26 can execute the swinging motion only at the neutral position of the sliding motion.

A contact motion performed when the knob 65 and the lever 26 execute the swinging motion will be described. When the lever 26 is swung clockwise about the swing shafts 27 from the non-actuating state in FIG. 5 and FIG. 7 as described above, the swing sheet portion 52 on the left side of the lever 26 moves downward and the swing sheet portion 53 on the right side thereof moves upward. As a result, the swing sheet portion 52 pushes the head portion 36b of the actuator 36, which is pressed against the lower surface of the swing sheet portion 52 by the spring force of the coil spring 50, so that the actuator 36 is lowered. As shown in FIG. 10, the lowering motion of the actuator 36 causes the movable contact slider 44 to slide through the inclined surface 47 thereof while compressing the coil spring 50. With this operation, the second movable contact 42 of the movable contact slider 44 and the fixed contacts 7a are turned ON. On the other hand, as shown in FIG. 6, the state of the right actuator 36 is not changed from the state shown in the FIG. 5 because the right swing sheet portion 53 is lifted. Thus, the movable contact slider 45 is not slid and remains in an OFF state.

When the swing actuation force is removed, the knob 65 and the lever 26 are raised by the return force of the ball 58 which is pressed by the coil spring 67 and tends to return to the neutral position of the first cam portion 59. Thus, the knob 65 and the lever 26 are returned to the state shown in FIG. 5 (FIG. 7). At the time, the movable contact slider 44 is also returned to an OFF position by the spring force of the coil spring 50. Note, the spring force of the coil spring 50 also acts as a force for lifting the actuator 36, it also acts as the return force of the knob 65 and the lever 26.

Figure 6:
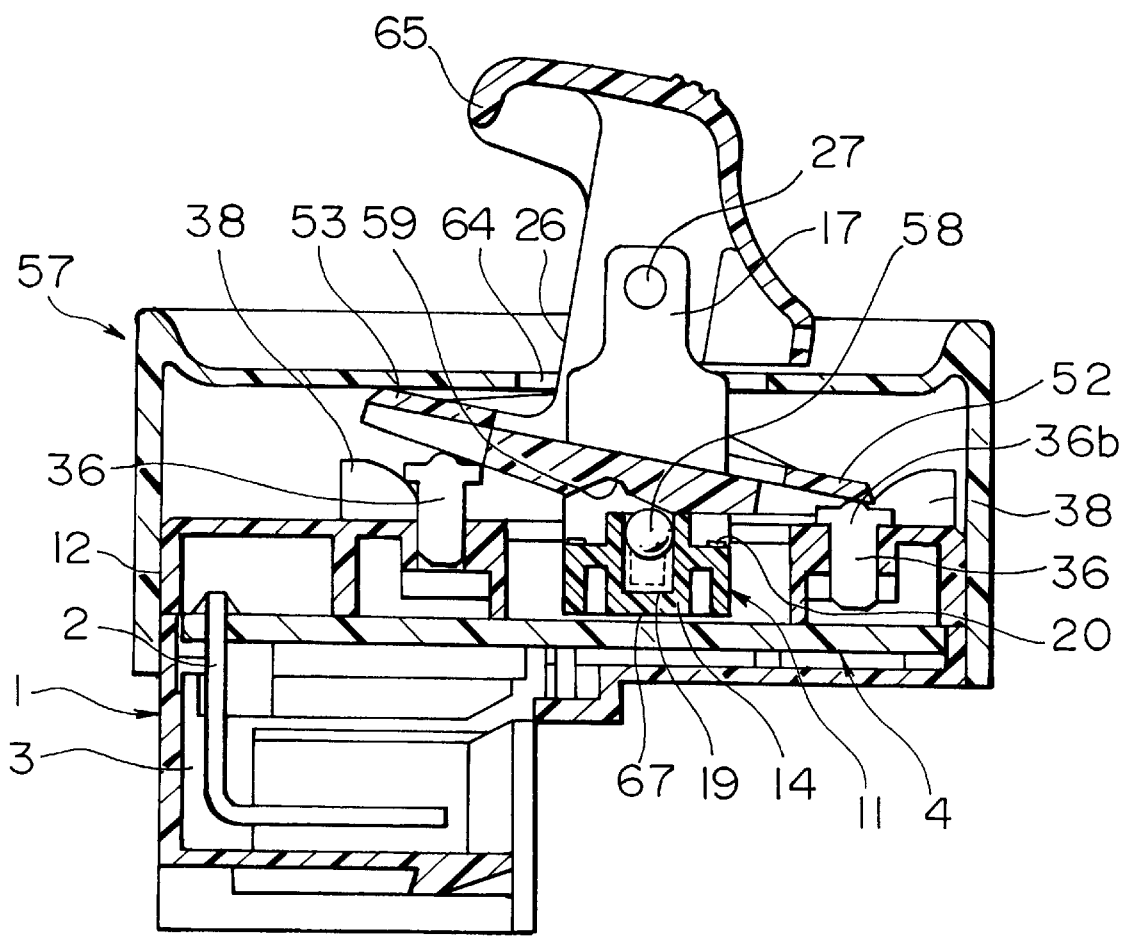
FIG. 6 is a sectional view showing a state that the slider is swung from the neutral position.

Next, described is a case that an actuation force acts to cause the knob 65 and the lever 26 to execute a sliding motion while they are being swung from the state in FIG. 5 to the state in FIG. 6 or after the completion of the swing motion.

Usually, a force is applied to the knob 65 and the lever 26 by the action of the second cam portion 60, the ball 61 and the coil spring 68 so that they are held at the neutral position of the sliding motion. When an actuation force exceeding the above force is applied in the sliding direction, although the sliding motion is executed while the swinging motion is being executed, this problem is solved as described below.

That is, when the knob 65 and the lever 26 are swung clockwise from the state in FIG. 5 as described above, the end of the swing sheet portion 52 of the lever 26 moves along the inner inclined portion of the second projection 38 on the right side. Therefore, when an actuating force in the sliding direction (right direction) is applied to the knob 65 and the lever 26 and the slider 11 tends to slide in the right direction, the end of the swing sheet portion 52 of the lever 26 is abutted against the inner inclined portion of the second projection 38 on the right side and regulates the sliding motion of the slider 11 in the right direction.

Note, when the knob 65 and the lever 26 are swung counterclockwise from the state in FIG. 5, the end of the swing sheet portion 53 of the lever 26 is abutted against the inner inclined portion of the second projection 38 on the left side and regulates the sliding motion of the slider 11 in the left direction.

Figure 4:
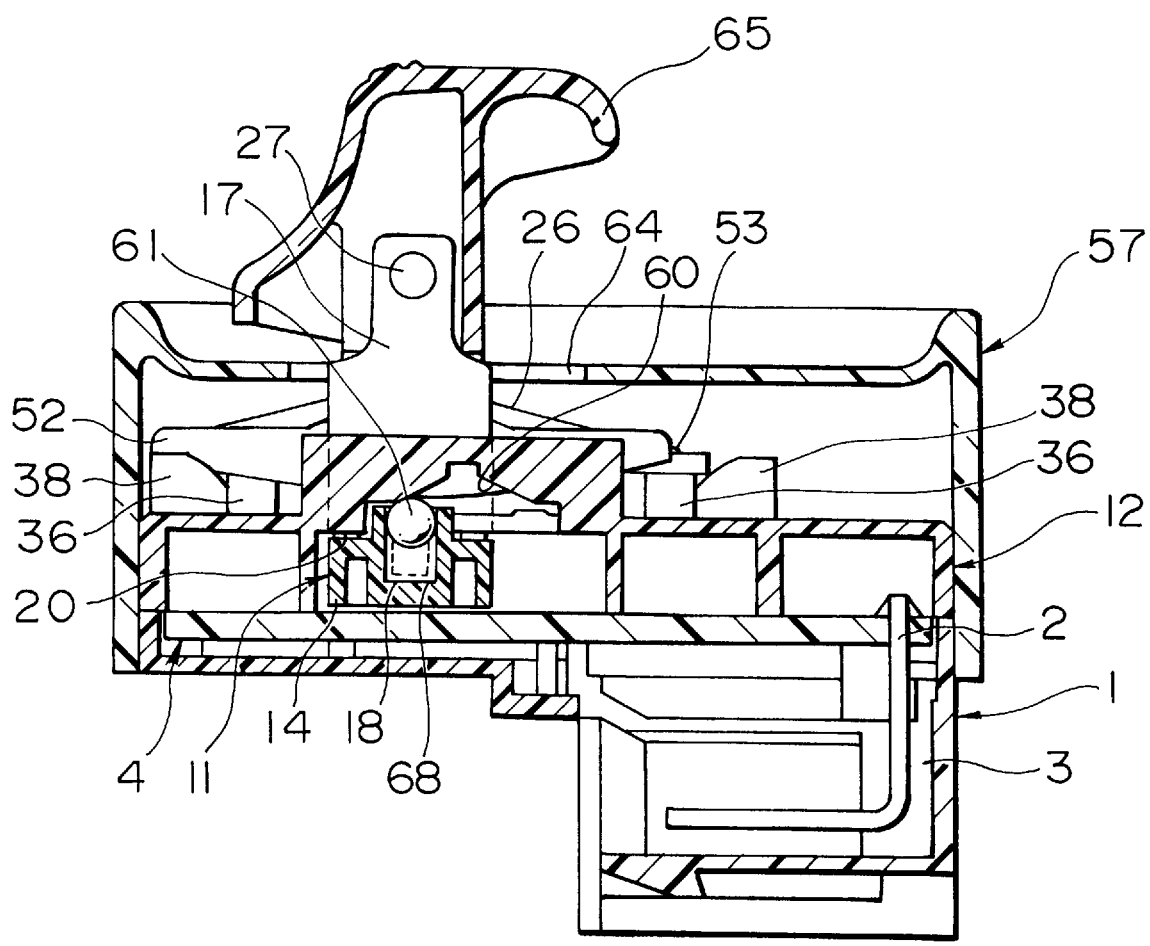
FIG. 4 is a sectional view showing a state that a slider is slid from a neutral position in FIG. 3.

Next, a sliding motion from the non-actuating state in FIG. 3 (and FIG. 5, FIG. 7) will be described with reference to FIG. 4.

When an actuation force is applied to the knob 65 in the sliding direction (left direction) from the state in FIG. 5, the knob 65 slides in the left direction together with the lever 26 arranged integrally with the knob 65 and the cover 11 coupled therewith. When the sliding motion is executed, since the ball 61 accommodated in the ball and coil spring accommodating portion 18 of the slider 11 also slides in the left direction, the ball 61 located at the neutral position at the center of the second cam portion 60 of the holder 12 slides to the inclined portion of the second cam portion 60. As a result, the ball 61 is gradually pushed downward by the inclined portion to thereby compress the coil spring 68 so as to achieve the state in FIG. 4.

When the lever 26 slides in the left direction from the neutral position of the sliding motion, the first projections 35, 35 of the holder 12 are removed from the swinging motion permitting openings 56, 56 of the swing sheet portions 52, 53 of the lever 26 and located to the lower surfaces of the swing sheet portions 52, 53. Then, when the lever 26 tends to be swung, the first projection 35 is abutted against the lower surface of the swing sheet portion 52 to thereby regulate the swinging motion of the lever 26. Further, the second projection 38 on the right side also enters the lower surface of the swing sheet portion 52 near to the end thereof and is abutted against the lower surface of the swing sheet portion 52 to thereby regulate the swinging motion of the lever 26. With this operation, the lever 26 is slid to the state in FIG. 8.

Since the lever 26 is not swung while it is in the sliding motion, the actuators 36, 36 are not actuated and switching relating to the second movable contacts 42, 43 is not executed. Further, since no swinging motion is executed in the sliding motion, the first cam portion 59, the ball 58 and the like relating to the swinging motion move in the left direction while remaining at the neutral position of the swinging motion in FIG. 5.

A contact motion executed in the sliding motion of the knob 65 and the lever 26 will be described. As described above, when the knob 65 and the lever 26 are slid in the left direction from the non-actuating state in FIG. 7, the slider 11 coupled with the knob 65 and the lever 26 also slides in the left direction integrally therewith. Then, the first movable contact 15 accommodated in the slider 11 is also slid on the printed wiring board 4 to thereby turn ON the fixed contact 8.

Figure 8:
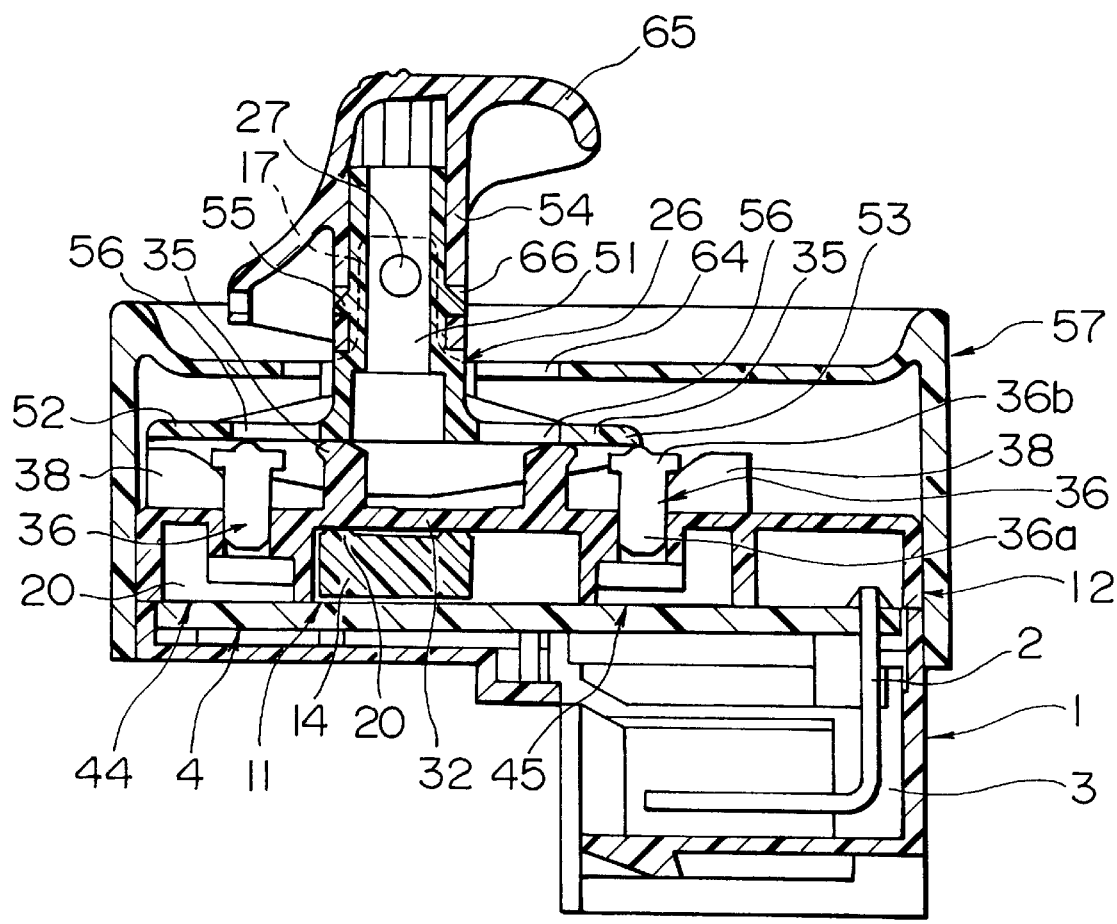
FIG. 8 is a sectional view showing a state that the slider is slid from a neutral position in FIG. 7.

When an actuation force in the sliding direction is removed from the ON state in FIG. 8, the knob 65 and the lever 26 are slid in the right direction and returned to the state in FIG. 7 by the return force of the ball 61, which is pressed against the coil spring 68 and tends to return to the neutral position of the second cam portion 60, whereby the ON state is turned to an OFF state.

Note, the case 57, the cover 1 and the like correspond to the case member. Although the lever is arranged independently of the knob in the embodiment, they may be arranged as a single part. Further, the second cam portion 60 may be disposed on the case member such as the case 57 or the like in addition to it being disposed on the holder 12.

The above embodiment includes the case 57 and the cover 1, the slider 11 slidingly accommodated in the case 57 and the cover 1, the first projections 35, 35 disposed on the case 57 and the cover 1, the lever 26 swingingly supported by the slider 11 and having the swinging motion permitting openings 56, 56 which permit the lever 26 to turn in such a manner that the first projections 35, 35 enter the swinging motion permitting openings 56, 56 only when the lever 26 is turned at a predetermined position of the slider 11, the second projections 38, 38 disposed on the case 57 and the cover 1 and abutted against the lever 26 when it is turned to thereby prevent the sliding motion of the slider 11, the first movable contact 15 attached to the slider 11, the second movable contacts 42, 43 attached to the lever 26, and the fixed contacts 8, 7a and 7b which are disposed to the case 57 and the cover 1 and with which the second movable contacts 42, 43 come into sliding contact. As a result, even if a strong force is applied to the knob ,65, since the force can be received by the flat portion of the lever 26 or by a plurality of positions with respect to the first projections 35, 35 and the second projections 38, 38, the lever 26 can be moved in the four directions, that is, in both the sliding directions and both the swinging directions. Further, even if a strong force is applied to the lever 26, since it can disperse the force, there is no possibility of deformation and breakage, as in the prior art. Further, since the structure of a metal mold is simplified, the cost of same can be lowered. Further, because a cross groove used in prior art is not formed to the case, failure such as insufficient contact and the like due to the invasion of dusts into the switch does not arise.

In the embodiment, the approximately V-shaped first cam portion 59 is disposed to the lever 26, the approximately V-shaped second cam portion 60 is disposed on the holder 12 (or the case 57 and the cover 1), the balls 58, 61, which are in elastic contact with the first cam portion 59 or the second cam portion 60, respectively, are disposed on the slider 11, the lever 26 in the non-actuating state is returned to the neutral position by the ball 58, which is in elastic contact with the first cam portion 59, and the slider 11 in the non-actuating state is returned to the neutral position by the ball 61, which is in elastic contact with the second cam portion 60. As a result, the motion in the four directions, that is, in both the sliding directions and both the swing directions, can be independently and stably executed by the simple structure.

Further, the embodiment includes the printed wiring board 4, at least the two switch elements disposed on the printed wiring board 4, the holder 12 located on the printed wiring board 4, the slider 11 slidingly moving between the printed wiring board 4 and the holder 12, the openings 33, 34 defined on the holder 12 (note, the number of the openings is not limited to two), the lever swingingly supporting portions 17, 17 disposed on the slider 11 and projecting from the openings 33, 34, the lever 26 supported by the lever swingingly supporting portions 17, 17, the ball 58 disposed on any one of the lever 26 and the slider 11 and urged, the returning first cam portion 59 which is disposed on the other of the lever 26 and the slider 11 and against which the ball 58 is urged, the ball 61 disposed on any one of the holder 12 and the slider 11 and urged, and the returning second cam portion 60 which is disposed on the other of the slider 11 and the holder 12 and against which the ball 61 is urged. The swinging motion of the lever 26 causes at least one of the switch elements to open and close and the sliding motion of the slider 11 causes at least the other of the switch elements to open and close. As a result, since the return mechanism of the sliding and swinging motions is completed while the holder 12, the slider 11 and the lever 26 are assembled, an assembly job can be easily executed thereafter. Further, since the switch elements do not relate to the return mechanism, the reliability of switching is not lowered and various types of switch mechanisms can be employed.

According to one form of the invention, even if a strong force is applied to the knob, since the force can be received by the flat portion of the lever or by a plurality of positions with respect to the first projections and the second projections, the lever can be moved in the four directions, that is, in both the sliding directions and both the swing directions. Further, even if the strong force is applied to a lever, since it can disperse the force, there is no possibility of deformation and breakage, as in prior art. Also since the structure of a molding metal mold is simplified, the cost of same can be lowered.

According to another form of the invention, the motion in the four directions, that is, both the sliding directions and both the swing directions, can be independently and stably executed from the neutral position by the simple arrangement.

According to still another form of the invention, since the return mechanism of the sliding and swinging motions is completed while the holder, the slider and the lever are assembled, an assembly job can be easily executed thereafter. Further, since the switch elements do not relate to the return mechanism, the reliability of switching is not lowered and various types of switch mechanisms can be employed.

What is claimed is:

1. A seesaw sliding composite motion switch, comprising:

a case member;

first projection disposed on said case member;

a slider slidingly accommodated in said case member;

a lever swingingly supported by said slider and having swinging motion permitting openings into which said first projections are inserted only when slider is turned at a predetermined position to thereby permit said lever to swing;

second projections disposed on said case member and abutted against said lever when said lever is swung to thereby limit the sliding motion of said slider;

a first switch element moved by the sliding motion of said slider; and a second switch element moved by the swinging motion of said lever.

2. A seesaw sliding composite motion switch according to claim 1, wherein an approximately V-shaped first cam portion is disposed on said lever as well as an approximately V-shaped second cam portion is disposed on said case member, first and second actuating members, which come into elastic contact with said first cam portion or said second cam portion, are disposed on said slider, said lever in a non-actuating state is returned to a neutral position by the pressurized contact force of said first actuating member which is in elastic contact with said first cam and said slider in a non-actuating state is returned to the neutral position by the pressurized contact force of said second actuating member which is in elastic contact with said second cam.

* * * * *